United States Patent [19]

Kopich

[11] 4,222,473

[45] Sep. 16, 1980

[54] FOUR WAY PAWL CLUTCH

[75] Inventor: Leonard F. Kopich, Madison Heights, Mich.

[73] Assignee: General Motors Corporation, Detroit, Mich.

[21] Appl. No.: 17,387

[22] Filed: Mar. 5, 1979

[51] Int. Cl.³ .................. F16D 11/06; F16D 13/04
[52] U.S. Cl. .................. 192/43.1; 188/82.7; 192/40
[58] Field of Search .................. 188/82.2, 82.7, 82.77; 192/40, 41 R, 41 A, 43, 43.1, 45.1, 47

[56] References Cited

U.S. PATENT DOCUMENTS

| | | | |
|---|---|---|---|
| 1,469,700 | 10/1923 | Sheldon | 192/43 |
| 1,470,074 | 10/1923 | Gomez | 192/43 |
| 1,609,698 | 12/1926 | Constantinesco | 192/43 |
| 1,664,320 | 3/1928 | Pitter | 192/43 |
| 1,915,643 | 6/1933 | Barnes | 192/43 |
| 2,134,420 | 10/1938 | Smith . | |
| 2,181,244 | 11/1939 | McGrew . | |
| 2,404,092 | 7/1946 | Reynolds . | |
| 2,720,296 | 10/1955 | Briglia . | |
| 2,773,574 | 12/1956 | Able . | |
| 3,102,618 | 9/1963 | Lund . | |
| 3,216,544 | 11/1965 | Ryan . | |
| 3,599,767 | 8/1971 | Sederquist . | |

FOREIGN PATENT DOCUMENTS

| | | | |
|---|---|---|---|
| 528202 | 6/1931 | Fed. Rep. of Germany | 192/43 |
| 139343 | 6/1930 | Switzerland | 192/43 |

*Primary Examiner*—Lawrence J. Staab
*Attorney, Agent, or Firm*—F. J. Fodale

[57] ABSTRACT

A four-way pawl clutch has forward and reverse drive pawls pivotally mounted on a cage. The cage carries two indexable phasing rings. One is resiliently coupled to the forward drive pawls by overcenter leaf springs which bias the forward drive pawls toward or away from an engaged position with the clutch drive members depending on the indexed position of the phasing ring. The second phasing ring is resiliently coupled to the reverse drive pawls in a like manner. The two phasing rings may be indexed to provide freewheel, forward drive, reverse drive and lock-up modes of operation. The two phasing rings may be remotely controlled by solenoids or the like. The two phasing rings may also be coupled so that the four-way sprag clutch operates essentially as a two-way dog clutch.

5 Claims, 11 Drawing Figures

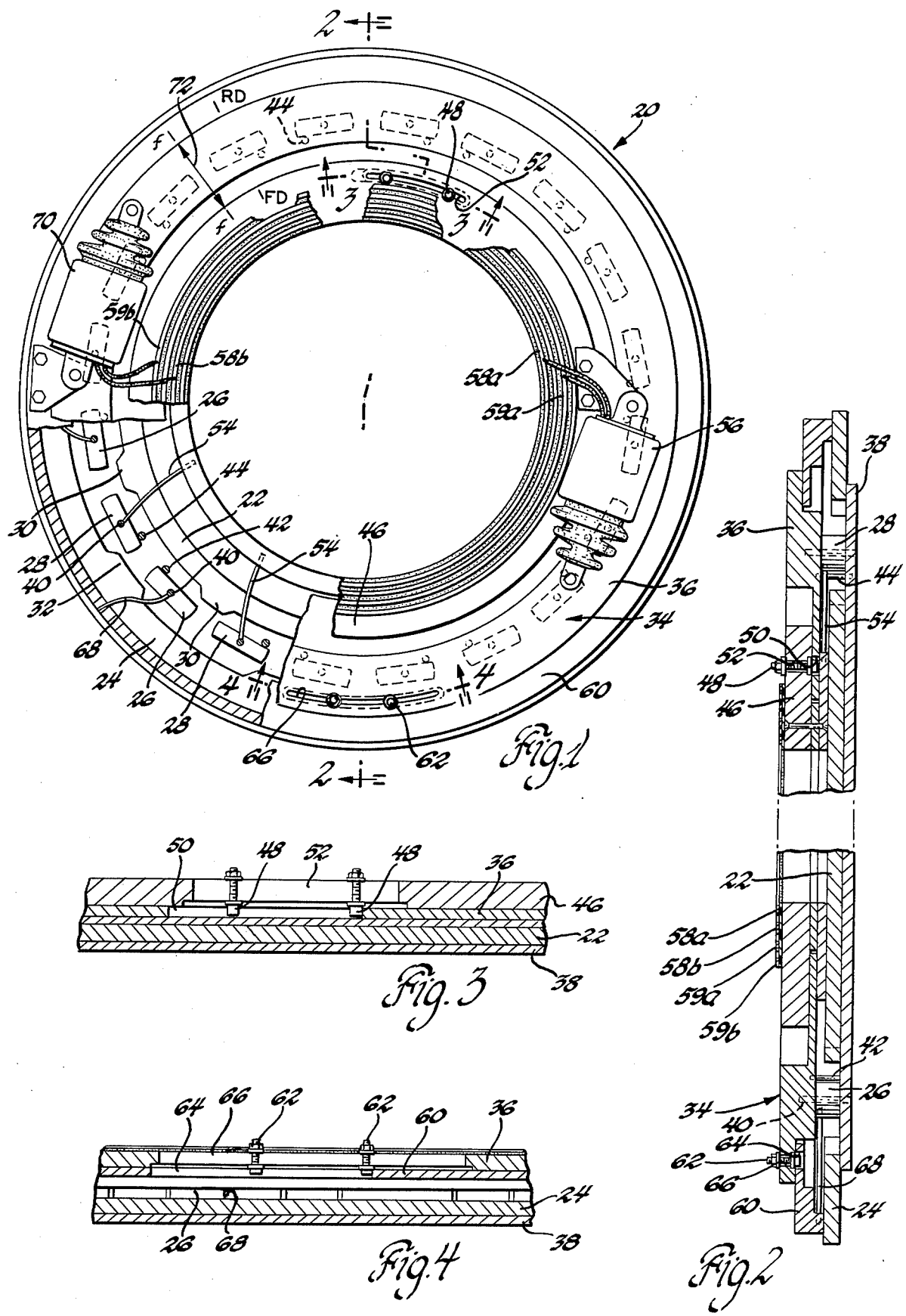

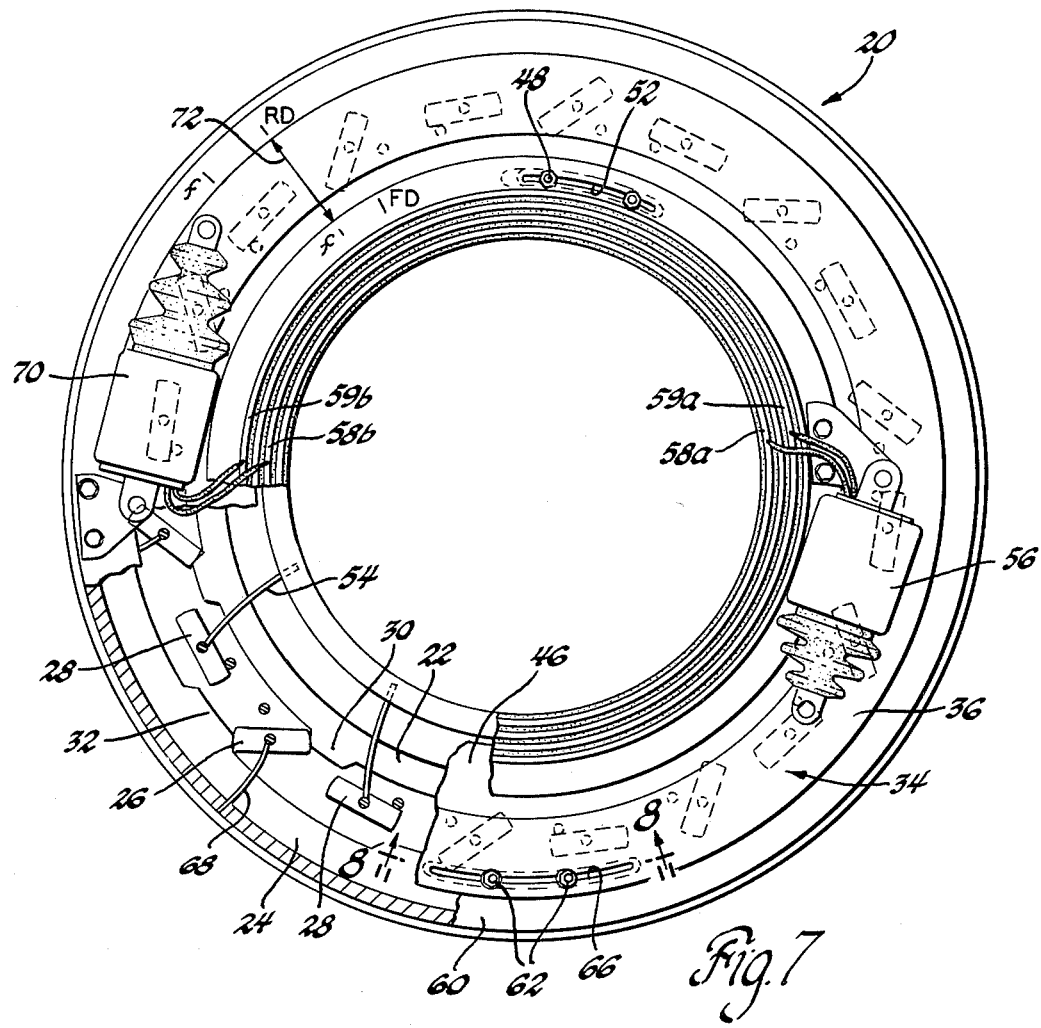
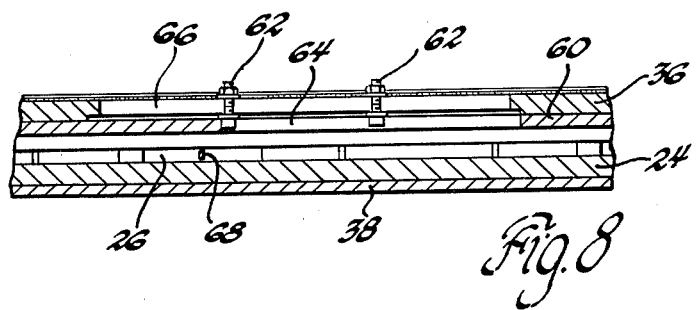

FOUR WAY PAWL CLUTCH

This invention relates generally to clutches and more particularly to pawl clutches which have multiple modes of operation.

It is already known from the U.S. Pat. No. 2,181,244 granted to John A. McGrew on Nov. 28, 1939 for a "Propulsion Unit" to provide a reversible one-way pawl clutch which has two modes of operation—a unidirectional forward drive with forward overrunning of the driven member and a unidirectional reverse drive with reverse overrunning of the driven member. The McGrew clutch is characterized by sets of forward and reverse drive pawls pivotally carried by the drive member in a circumferential interspersed arrangement. The forward drive pawls automatically engage the driven member and the reverse drive pawls simultaneously disengage when the drive member drives forward and vice versa. According to the McGrew specification both sets of drive pawls disengage when the drive member stops permitting the driven member to turn freely in either direction.

The object of this invention is to provide a four-way pawl clutch which has four modes of operation, namely, unidirectional forward drive with forward overrunning of the driven member, unidirectional reverse drive with reverse overrunning of the driven member, freewheeling and positive lock-up.

Vehicles having both two-wheel drive and four-wheel drive capabilities are becoming increasingly popular due to consumer demand for versatility and the pressing need for maximum fuel economy. In such vehicles, two wheels, usually the two front wheels, are auxiliary driving wheels which are engaged by various clutching arrangements to assist or supplement the driving action of the two primary driving wheels, usually the rear wheels.

Another important object of this invention then is to provide a four-way pawl clutch capable of engaging or disengaging auxiliary driving wheels to switch back and forth between two-wheel and four-wheel drive during vehicle operation. In this regard, the four-way pawl clutch may be used in the transfer case which provides the power for the auxiliary driving wheels or in the differential for the auxiliary driving wheels. In fact, the clutch is useful in any device where the speeds of the driving and driven members are nearly synchronous and multiple modes of operation are desired.

Another object of this invention is to provide a four-way pawl clutch which can completely disengage the auxiliary driving wheels for pure two-wheel drive for normal highway operation; positively lock in the auxiliary driving wheels for pure four-wheel drive for low speed, off-the-highway operation; or automatically engage the auxiliary driving wheels responsive to vehicle needs such as slippage of the primary driving wheels.

An important feature of the invention is that the four-way pawl clutch has an easy and gentle transition between its operational modes.

Another feature of the invention is that the four-way pawl clutch has its pawls pivoted on a cage rather than one of the clutch drive members which permits light pawl pivot pins, pivot pin supporting structure and pawl engaging springs.

Another feature of the invention is that the four-way pawl clutch has centrally pivoted pawls which substantially neutralize the adverse effects of centrifugal force during operation.

Another feature of the invention is that the four-way pawl clutch is very thin in the axial direction and lends itself to applications like torque converters where axial space is limited.

Another feature of the invention is that the four-way pawl clutch has pawls which are not forced to disengage while the pawls are under load and thus avoid damage associated with forced disengagement.

Another feature of the invention is that operating mode changes of the four-way pawl clutch are achieved by overcenter action of light pawl springs which preprogram the mode changes but do not force the mode changes under high stress conditions thereby minimizing the wear of the mating parts.

Another feature is a wide spacing between the drive teeth which allows ample time for the operating mode changes to occur.

Another feature of the invention is that the four-way clutch lends itself to remote control and thus its operational modes can be selected by a driver inside a vehicle.

Another feature of the invention is that the four-way clutch can be controlled to operate essentially as a two-way dog clutch with the unidirectional drive modes serving as smooth transitions between the freewheeling and lock-up modes.

Other objects and features of the invention will become apparent to those skilled in the art as the disclosure is made in the following detailed description of a preferred embodiment of the invention as illustrated in the accompanying sheets of drawing in which:

FIG. 1 is a front view, partially sectioned, showing a four-way sprag clutch in accordance with this invention. The clutch is shown in the freewheeling mode.

FIG. 2 is a section taken substantially along the line 2—2 of FIG. 1 looking in the direction of the arrows.

FIG. 3 is a section taken substantially along the line 3—3 of FIG. 1 looking in the direction of the arrows.

FIG. 4 is a section taken substantially along the line 4—4 of FIG. 1 looking in the direction of the arrows.

FIG. 7 is a front view, part sectioned, showing the four-way sprag clutch in the unidirectional reverse drive mode.

FIG. 8 is a section along the line 8—8 of FIG. 7 looking in the direction of the arrows.

Figure 5:
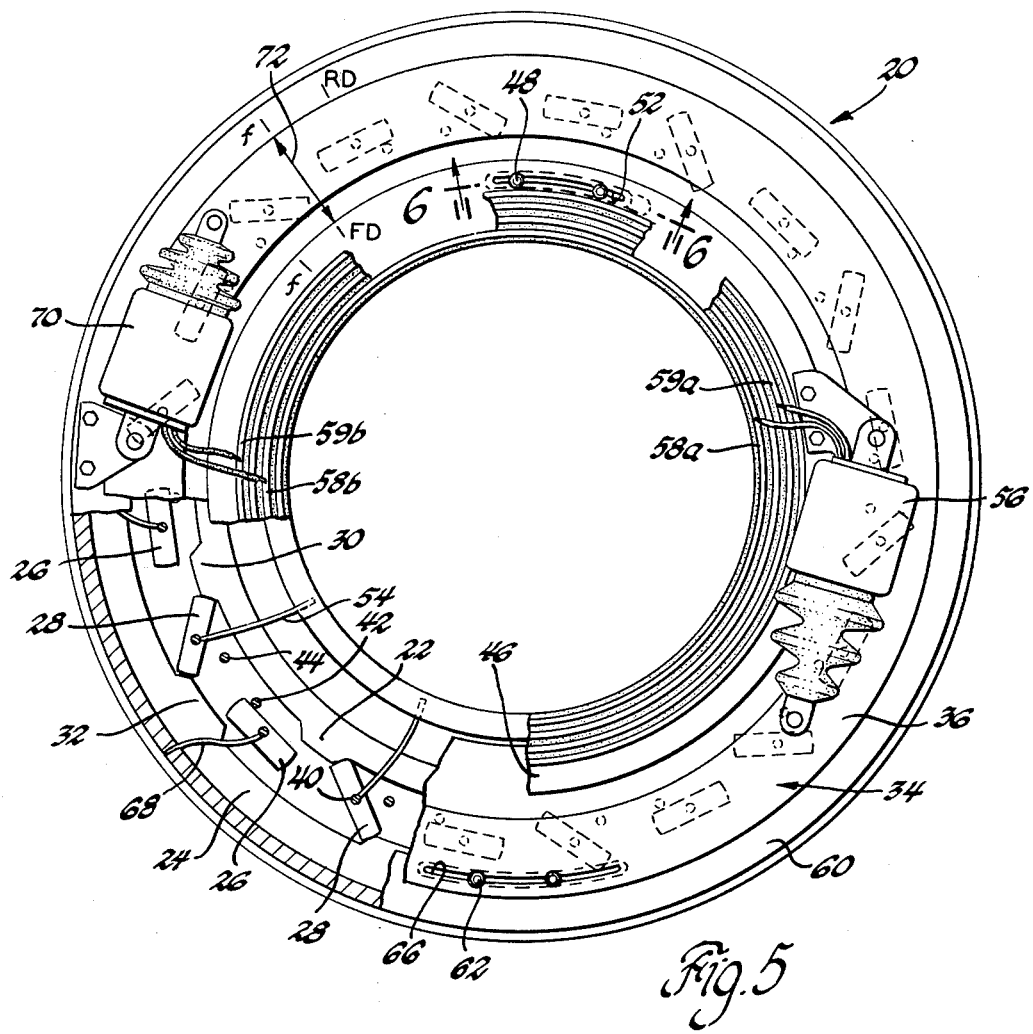
FIG. 5 is a front view, part sectioned, showing the four-way sprag clutch in the unidirectional forward drive mode.

Referring now to the drawing and particularly to FIGS. 1 and 2, the invention is embodied in a four-way pawl clutch 20 comprising an inner drive member 22, a concentrically arranged annular outer drive member 24 and two sets of drive pawls 26 and 28 which are disposed in the radial space between the drive members 22 and 24 in a circumferential interspersed arrangement. The inner drive member 22 has a plurality of circumferentially spaced trapezoidal drive teeth 30 which project outwardly and the outer drive member 24 has a plurality of circumferentially spaced trapezoidal drive teeth 32 which project inwardly.

The four-way pawl clutch 20 further includes a cage 34 comprising a front plate 36, a back plate 38 and pivot pins 40 which connect and axially space the front and back plates 36 and 38. The two sets of drive pawls 26 and 28 are disposed between the front and back plates 36 and 38 and pivoted on the pivot pins 40 at their centers. The cage front plate 36 has stop pins 42 associated with the set of drive pawls 26 and stop pins 44 associated with the set of drive pawls 28.

The clutch 20 also includes an inner phasing ring 46 which is operatively associated with the cage 34 and the set of drive pawls 28. The inner phasing ring 46 is circumferentially indexable on the cage 34 between a freewheel position shown in FIGS. 1, 2 and 3 and a unidirectional drive position shown in FIGS. 5, 6, 9, 10 and 11. The two positions are determined by a pin and slot arrangement best shown in FIGS. 3, 6 and 10; the freewheel position being shown in FIG. 3 and the unidirectional drive position being shown in FIGS. 6 and 10.

Figure 6:
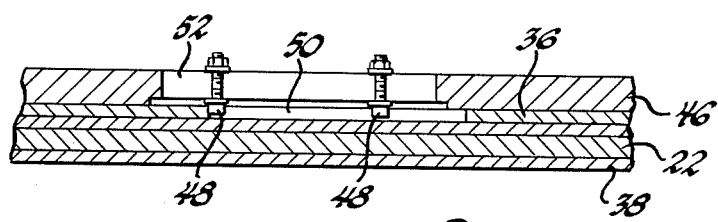
FIG. 6 is a section along the line 6—6 of FIG. 5 looking in the direction of the arrows.
Figure 10:
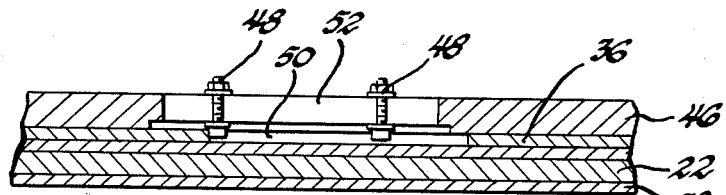
FIG. 10 is a section along the line 10—10 of FIG. 9 looking in the direction of the arrows.

More particularly, the inner phasing ring 46 carries two limit pins 48 which protrude into an arcuate slot 50 in the cage front plate 36. The limit pins 48 are adjustably secured in an arcuate slot 52 in the inner phasing ring 46 so that one of the limit pins 48 engages one end of the slot 50 to determine the freewheel position as shown in FIG. 3 and the other of the limit pins 48 engages the other end of the slot 50 to determine the unidirectional drive position as shown in FIGS. 6 or 10.

The drive pawls 28 are resiliently coupled to the inner phasing ring 46 by leaf springs 54. The leaf springs 54 are slightly bowed in the position shown in FIG. 1 and bias the drive pawls 28 counterclockwise against the stop pins 44.

The inner phasing ring 46 may be indexed in any number of ways. For instance, the four-way pawl clutch 20 may include a double acting solenoid 56 having its housing secured to the inner phasing ring 46 and its plunger secured to the cage front plate 36. The solenoid 56 is actuated via slip rings 58a and 59a to index the inner phasing ring 46 between the freewheel position and the unidirectional drive position.

The clutch 20 also includes an outer phasing ring 60 which is operatively associated with the cage 34 and the set of drive pawls 26. The outer phasing ring 60 is also circumferentially indexable on the cage 34 between a freewheel position shown in FIGS. 1, 2 and 3 and a unidirectional drive position shown in FIGS. 7, 8, 9, 10 and 11. The two positions of the outer phasing ring 60 are also determined by a pin and slot arrangement.

In this instance, the cage front plate 36 carries two limit pins 62 which protrude into an arcuate slot 64 in the outer phasing ring 60. The limit pins 62 are adjustably secured in an arcuate slot 66 in the cage front plate 36 so that one of the limit pins 62 engages one end of the slot 64 to determine the freewheel position as shown in FIG. 4 and the other of the limit pins 62 engages the other end of the slot 64 to determine the unidirectional drive position as shown in FIGS. 8 or 10.

The drive pawls 26 are resiliently coupled to the outer phasing ring 60 by leaf springs 68. The leaf springs 68 are slightly bowed in the position shown in FIG. 1 and bias the drive pawls 26 clockwise against the stop pins 42.

The outer phasing ring 60 may be indexed in any number of ways including a second double acting solenoid 70 having its housing secured to the outer phasing ring 60 and its plunger secured to the cage front plate 36. The solenoid 70 is actuated via slip rings 58b and 59b to index the outer phasing ring 60 between the freewheel position and the positive unidirectional drive position.

OPERATION

The four-way pawl clutch 20 has four modes of operation, each of which is determined by the respective indexed positions of the phasing rings 46 and 60. For descriptive convenience, the inner and outer drive members 22 and 24 are hereinafter sometimes referred to as the drive and driven members respectively although their roles can obviously be reversed. Drive in the clockwise direction is arbitrarily designated forward drive and thus the drive pawls 28 are hereinafter referred to as forward drive pawls 28 while the drive pawls 26 are designated reverse drive pawls 26.

The four modes of operation then may be described as: (1) a freewheeling mode where the drive member 22 and driven member 24 are disconnected and the driven member 24 freewheels irrespective of the rotational direction of the drive member 22; (2) a forward drive mode where the drive member 22 drives the driven member 24 in the forward direction and the driven member 24 can overrun in the forward direction; (3) a reverse drive mode where the drive member 22 drives the driven member 24 in the reverse direction and the driven member 24 can overrun in the reverse direction; and (4) a positive lock-up mode where the drive member 22 drives the driven member 24 in both the forward and reverse directions and the outer drive member 24 cannot overrun in either direction. To further aid in describing the operation, the cage 34 is scribed with a base line 72, the phasing ring 46 is scribed with a freewheel mode line f and a forward drive mode line FD and the phasing ring 60 is scribed with a freewheel mode line f and a reverse drive mode line RD.

The freewheeling mode occurs when the phasing rings 46 and 60 are indexed to their respective freewheel position on the cage 34 which is shown in FIGS. 1, 2, 3 and 4 and indicated by the scribed freewheel mode lines f being aligned with the scribed base line 72 on the cage 34. In this condition, the inner phasing ring 46 positions the inner ends of the leaf springs 54 so that the set of forward drive pawls 28 are biased against the stop pins 44 out of engagement with the drive teeth 30 and 32 and the outer phasing ring 60 positions the outer ends of the leaf springs 68 so that reverse drive pawls 26 are biased against the stop pins 42 also out of engagement with the drive teeth 30 and 32. The inner and outer drive members 22 and 24 are not drivingly connected and the outer driven member 24 may freewheel irrespective of the rotational direction of the inner drive member 22.

The freewheeling mode is changed to the forward drive mode (drive in the clockwise direction) by indexing the inner phasing ring 46 clockwise on the cage 34 to the forward drive position which is shown in FIGS. 5 and 6 and indicated by the forward drive mode line FD scribed on the inner phasing ring 46 being aligned with the base line 72 scribed on the cage 34. When the inner phasing ring 46 is indexed to this position, the inner ends of the leaf springs 54 move overcenter of the pivot pins 40 and the leaf springs 54 snap over changing the pivotal bias on the set of forward drive pawls 28 from counterclockwise to clockwise. This clockwise bias on the forward drive pawls 28 preprograms the forward drive pawls 28 to engage drive teeth 30 and 32 as shown in FIG. 5. That is, the light forces of the springs 54 gently urge the forward drive pawls 28 against the one or both the drive members 22 and 24 depending on the positions of the drive teeth 30 and 32. The forward drive pawls 28 then gently ride on one or both drive members 22 and 24 until they engage teeth 30 and then teeth 32 or vice versa. This gentle engagement is accommodated by the wide spacings between the teeth 30 and between the teeth 32 and occurs quite quickly when the drive members 22 and 24 are nearly synchronous. When the forward drive pawls 28 are engaged as shown in FIG. 5, the inner drive member 22 drives the outer drive member 24 in the forward direction only and the outer drive member 24 can overrun in the forward direction.

The freewheeling mode is changed to the reverse drive mode (drive in the counterclockwise direction) by indexing the outer phasing ring 60 clockwise on the cage 34 to the reverse drive position which is shown in FIGS. 7 and 8 and indicated by the reverse drive mode line RD scribed on the outer phasing ring 60 being aligned with the base line 72 scribed on the cage 34. When the outer phasing ring 60 is indexed to this position, the outer ends of the leaf springs 68 move overcenter of the pivot pins 40 and the leaf springs 68 snap over changing the pivotal bias on the set of reverse drive pawls 26 from clockwise to counterclockwise. The clockwise bias on the reverse drive pawls 26 preprograms the reverse drive pawls 26 which then gently engage the drive teeth 30 and 32 as shown in FIG. 7. Once engaged the inner drive member 22 drives the outer drive member 24 in the reverse direction only and the outer drive member 24 can overrun in the reverse direction.

Figure 9:
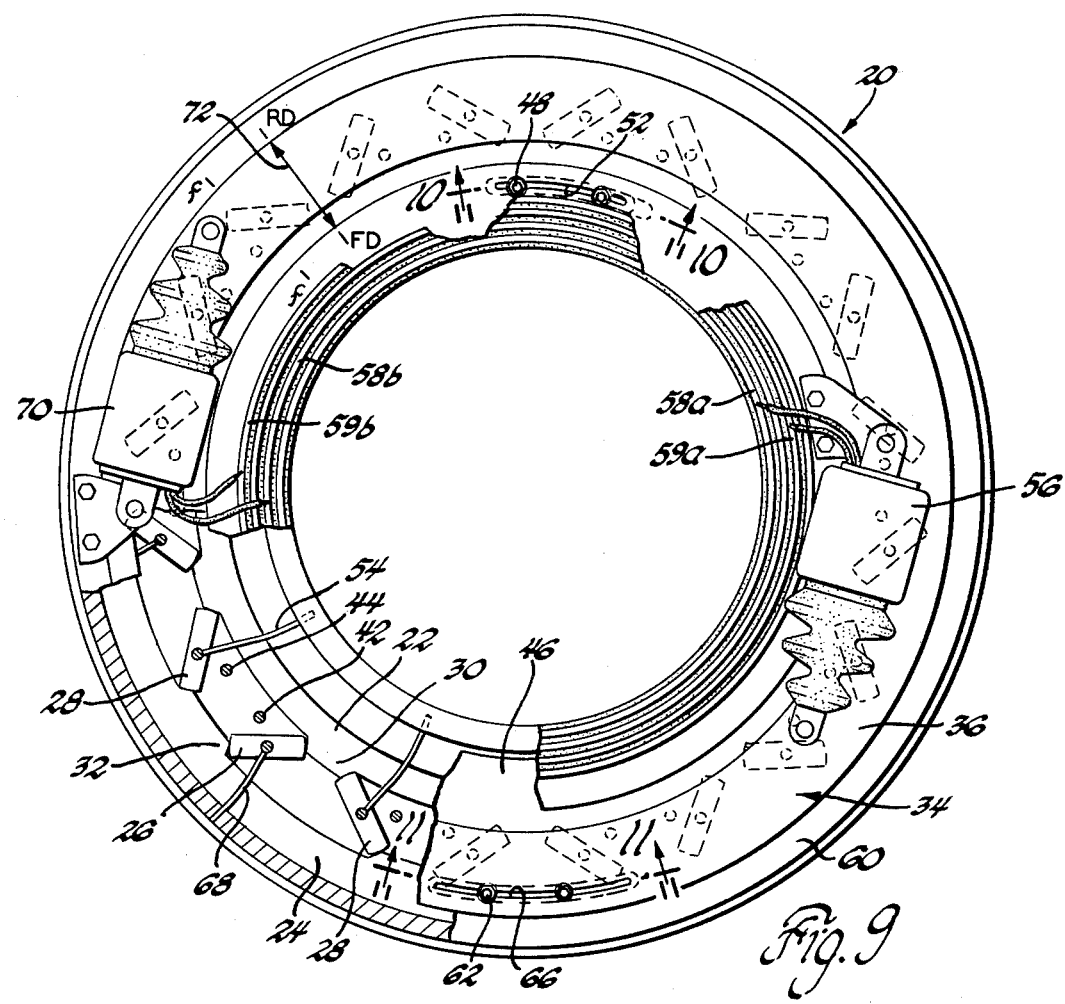
FIG. 9 is a front view, part sectioned, showing the drive mechanism in a positive bidirectional drive mode.
Figure 11:
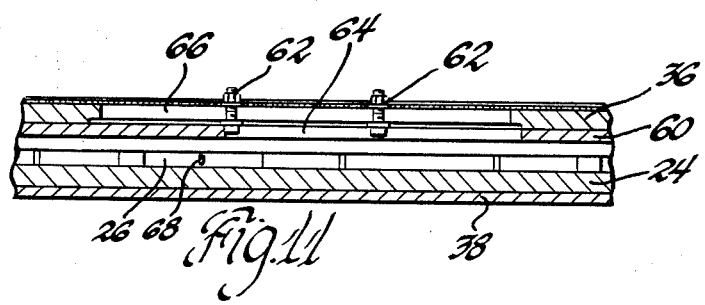
FIG. 11 is a section along the line 11—11 of FIG. 9 looking in the direction of the arrows.

The freewheel mode is changed to the lock-up mode (bidirectional drive) by indexing both the inner and outer phasing rings 46 and 60 clockwise on the cage 34 to their respective drive positions as shown in FIGS. 9, 10 and 11. When the phasing rings 46 and 60 are indexed to these respective positions (which are indicated by the scribed mode lines FD and RD both being aligned with the base line 72 scribed on the cage 34), the ends of the leaf springs 54 and 68 anchored to their respective phasing rings move overcenter of their associated pivot pins 40 causing the leaf springs 54 and 68 to snap over and change the pivotal bias on the forward and reverse drive pawls 26 and 28. Both sets of drive pawls 26 and 28 are then preprogrammed to engage the drive teeth 30 and 32 as shown in FIG. 9. When both sets of drive pawls 26 and 28 are preprogrammed, the drive pawls in the drive direction engage as if changing to a unidirectional drive and then the drive pawls in the non-drive direction merely snap into position. For instance, the forward drive pawls 28 in a forward drive condition, engage as if changing to the forward drive mode and the reverse drive pawls 26 then merely snap into position. In the positive lock-up mode the inner drive member 22 drives the outer drive member 24 in either the forward or reverse directions and the outer drive member 24 cannot overrun in either direction.

The lock-up mode is changed back to the freewheel mode by indexing both the inner and the outer phasing rings 46 and 60 counterclockwise on the cage 34 to their respective freewheel positions as shown in FIGS. 1, 2, 3 and 4. When the phasing rings 46 and 60 are indexed to these respective positions (which are indicated by both the scribed mode lines f being aligned with the base line 72 scribed on the cage 34), the leaf springs 54 and 68 snap over and reverse the pivotal biases on the forward and reverse drive pawls 26 and 28. The set of non-driving pawls, for instance the reverse drive pawls 26 in a forward drive condition, are unloaded and move to the freewheeling position against the stop pins 42 immediately. The forward drive pawls 28, however, are merely preprogrammed to move to the freewheeling position against the stop pins 44 because of the light forces of the springs 54 which are insufficient to disengage the forward drive pawls 28 while under load. As soon as the load is removed, however, the forward drive pawls 28 immediately snap to the freewheel position. This can be accomplished in a vehicle context simply by the driver lifting his foot off the accelerator momentarily. It can be seen from the above description that the four-way clutch has four different modes of operation which are determined by indexing the two phasing rings 46 and 60. These modes can be selected at will and it is possible to change from any one of the four modes to any other one of the four modes. As indicated previously these phasing rings may be remotely controlled from a convenient location by double acting solenoids 56 and 70. It is also possible to couple the phasing rings 46 and 60. The four-way sprag clutch is essentially a two-way dog clutch having freewheel and positive lock-up modes. For instance the slip rings 58a and 58b could be combined and the slip rings 59a and 59b could be combined so that the double acting solenoids 56 and 70 index the phasing rings 46 and 60 between their respective freewheel position and driving positions. In this instance, the forward and reverse drive modes would still operate in the transition periods to provide gentle engagement and prevent disengagement under load.

The embodiment of the invention described above is in the nature of a demonstration model constructed for the purpose of illustrating the principles of the invention and is not to be considered as limiting or restricting the invention since many modifications may be made by the exercise of skill in the art without departing from the scope of the invention.

The embodiments of the invention in which an exclusive property or privilege is claimed are defined as follows:

1. A pawl clutch comprising:
    radially spaced inner and outer drive members each having a plurality of circumferentially spaced drive teeth,
    a cage having first and second sets of pivotally mounted drive pawls disposed between the inner and outer drive members,
    said first set of drive pawls being pivotal between a freewheel position disengaged from the drive teeth and a forward drive position engaging the drive teeth whereby one of the drive members drives the other in a forward direction,
    first phasing means resiliently coupled to the first set of drive pawls for selectively biasing the first set of drive pawls toward either the freewheel or the forward drive position,
    said second set of drive pawls being pivotal between a freewheel position disengaged from the drive teeth and a reverse drive position engaging the drive teeth whereby the one drive member drives the other in a reverse direction, and
    second phasing means resiliently coupled to the second set of drive pawls for selectively biasing the second set of drive pawls toward either the freewheel position or the reverse position, said pawl clutch freewheeling when both sets of drive pawls are biased in their respective freewheel positions, driving in one or the other direction when one set of drive pawls is biased in the drive position and the other set of drive pawls is biased in the freewheel position, and locking-up when both sets of drive pawls are biased in their respective drive positions.

2. A pawl clutch comprising:

radially spaced inner and outer drive members each having a plurality of circumferentially spaced drive teeth:

a cage having first and second sets of pivotally mounted drive pawls disposed between the inner and outer drive members, said first set of drive pawls being pivotal between a freewheel position disengaged from the drive teeth and a forward drive position engaging the drive teeth whereby one of the drive members drives the other in a forward direction, first phasing means comprising an indexable phasing ring resiliently coupled to the first set of drive pawls by spring means which selectively bias the first set of drive pawls toward either the freewheel or the forward drive position, said second set of drive pawls being pivotal between a freewheel position disengaged from the drive teeth and a reverse drive position engaging the drive teeth whereby the one drive member drives the other in a reverse direction, and second phasing means comprising an indexable phasing ring resiliently coupled to the second set of drive pawls by spring means which selectively bias the second set of drive pawls toward either the freewheel position or the reverse position, said pawl clutch freewheeling when both sets of drive pawls are biased in their respective freewheel positions, driving in one or the other direction when one set of drive pawls is biased in its drive position and the other set of drive pawls is biased in its freewheel position, and locking-up when both sets of drive pawls are biased in their respective drive positions.

3. A pawl clutch comprising:

radially spaced inner and outer drive members each having a plurality of circumferentially spaced drive teeth, a cage having first and second sets of pivotally mounted drive pawls disposed between the inner and outer drive members, said first set of drive pawls being pivotal between a freewheel position disengaged from the drive teeth and a forward drive position engaging the drive teeth whereby one of the drive members drives the other in a forward direction, a first phasing ring resiliently coupled to the first set of drive pawls by a first set of leaf springs, said first phasing ring being indexable with respect to the cage for selectively biasing the first set of drive pawls toward either the freewheel position or the forward drive position, said second set of drive pawls being pivotal between a freewheel position disengaged from the drive teeth and a reverse drive position engaging the drive teeth whereby the one drive member drives the other in a reverse direction, and a second phasing ring resiliently coupled to the second set of drive pawls by a second set of leaf springs, said second phasing ring being indexable with respect to the cage for selectively biasing the second set of drive pawls toward either the freewheel position or the reverse drive position, said pawl clutch freewheeling when both sets of drive pawls are biased in their respective freewheel positions, driving in one or the other direction when one set of drive pawls is biased in its drive position and the other set of drive pawls is biased in its freewheel position, and locking up when both sets of drive pawls are biased in their respective drive positions.

4. A pawl clutch comprising:

radially spaced inner and outer drive members each having a plurality of circumferentially spaced drive teeth, a cage having first and second sets of pivotally mounted drive pawls disposed between the inner and outer drive members, said first set of drive pawls being pivotal between a freewheel position disengaged from the drive teeth and a forward drive position engaging the drive teeth whereby one of the drive members drives the other in a forward direction, a first phasing ring resiliently coupled to the first set of drive pawls by a first set of leaf springs which pivotally bias the first set of drive pawls, said first phasing ring being indexably mounted on the cage to reverse the pivotal bias of the first set of leaf springs for selectively biasing the first set of drive pawls toward either the freewheel position or the forward drive position, said second set of drive pawls being pivotal between a freewheel position disengaged from the drive teeth and a reverse drive position engaging the drive teeth whereby the one drive member drives the other in a reverse direction, and a second phasing ring resiliently coupled to the second set of drive pawls by a second set of leaf springs which pivotally bias the second set of drive pawls, said second phasing ring being indexably mounted on the cage to reverse the pivotal bias of the second set of leaf springs for selectively biasing the second set of drive pawls toward either the freewheel position or the reverse drive position, said pawl clutch freewheeling when both sets of drive pawls are biased in their respective freewheel positions, driving in one or the other direction when one set of drive pawls is biased in its drive position and the other set of drive pawls is biased in its freewheel position, and locking up when both sets of drive pawls are biased in their respective drive positions.

5. A pawl clutch comprising:

radially spaced inner and outer drive members each having a plurality of circumferentially spaced drive teeth, p1 a cage having forward and reverse sets of pivotally mounted drive pawls disposed between the inner and outer drive members in a circumferential interspersed relationship, said forward set of drive pawls being pivotal between a freewheel position disengaged from the drive teeth and a forward drive position engaging the drive teeth whereby one of the drive members drives the other in a forward direction, an inner phasing ring indexably mounted on the cage and resiliently coupled to the forward set of drive pawls by an inner set of radially disposed leaf springs which pivotally bias the forward drive pawls, said inner phasing ring being indexable between two positions where the inner set of leaf springs produce opposite pivotal biases and respectively bias the forward set of drive pawls toward the freewheel and the forward drive positions, said reverse set of drive pawls being pivotal between a freewheel position disengaged from the drive teeth and a reverse drive position engaging the drive teeth whereby the one drive member drives the other in a reverse direction, and an outer phasing ring indexably mounted on the cage and resiliently coupled to the reverse set of drive pawls by an outer set of radially disposed leaf springs which pivotally bias the reverse drive pawls, said outer phasing ring being indexable between two positions where the outer set of leaf springs produce opposite pivotal biases and respectively bias the reverse set of drive pawls toward the freewheel and the reverse drive positions, said pawl clutch freewheeling when both sets of drive pawls are biased in their respective freewheel positions, driving in one or the other direction when one set of drive pawls is biased in its drive position and the other set of drive pawls is biased in its freewheel position, and locking up when both sets of drive pawls are biased in their respective drive positions.

* * * * *